(12) United States Patent  
Ishii

(10) Patent No.: US 11,573,429 B2  
(45) Date of Patent: Feb. 7, 2023

(54) POLARIZED LIGHT IRRADIATION APPARATUS AND METHOD FOR POLARIZED LIGHT IRRADIATION

(71) Applicant: Ushio Denki Kabushiki Kaisha, Tokyo (JP)

(72) Inventor: Kazumasa Ishii, Tokyo (JP)

(73) Assignee: Ushio Denki Kabushiki Kaisha, Tokyo (JP)

(*) Notice: Subject to any disclaimer, the term of this patent is extended or adjusted under 35 U.S.C. 154(b) by 189 days.

(21) Appl. No.: 17/125,216

(22) Filed: Dec. 17, 2020

(65) Prior Publication Data

US 2021/0191140 A1 Jun. 24, 2021

(30) Foreign Application Priority Data

Dec. 24, 2019 (JP) .............................. JP2019-232588

(51) Int. Cl.
*G02B 27/28* (2006.01)
*G02F 1/13* (2006.01)
*G02F 1/1337* (2006.01)

(52) U.S. Cl.
CPC ......... *G02B 27/286* (2013.01); *G02F 1/1303* (2013.01); *G02F 1/133788* (2013.01)

(58) Field of Classification Search
CPC .................................................. G02B 27/286
See application file for complete search history.

(56) References Cited

U.S. PATENT DOCUMENTS 7,061,679 B1 * 6/2006 Yoon ................... G02B 27/286
359/485.02

FOREIGN PATENT DOCUMENTS

JP 4968165 B2 7/2012

OTHER PUBLICATIONS

Seokil Moon et al., : Augmented reality near-eye display using Pancharatnam-Berry phase lenses, Scientific Reports 9, Article No. 6616, pp. 1-27(2019).

* cited by examiner

*Primary Examiner* — Edmond C Lau
(74) *Attorney, Agent, or Firm* — Studebaker & Brackett PC

(57) ABSTRACT

A polarized light irradiation apparatus includes: a light source unit including a light source, and emitting parallel light derived from the light source; a polarizing plate for polarizing the parallel light emitted from the light source unit to output polarized light; a polarizing plate holder for holding the polarizing plate; a mask holder for holding a mask having a light transmissive part and a light shielding part; a work stage for holding a work that is irradiated with light that has been polarized by the polarizing plate and has passed the mask; a polarization direction changer for changing a direction of a polarization axis of light for irradiating the work held by the work stage; and an irradiation location changer for changing a location of the polarized light that irradiates the work.

8 Claims, 7 Drawing Sheets

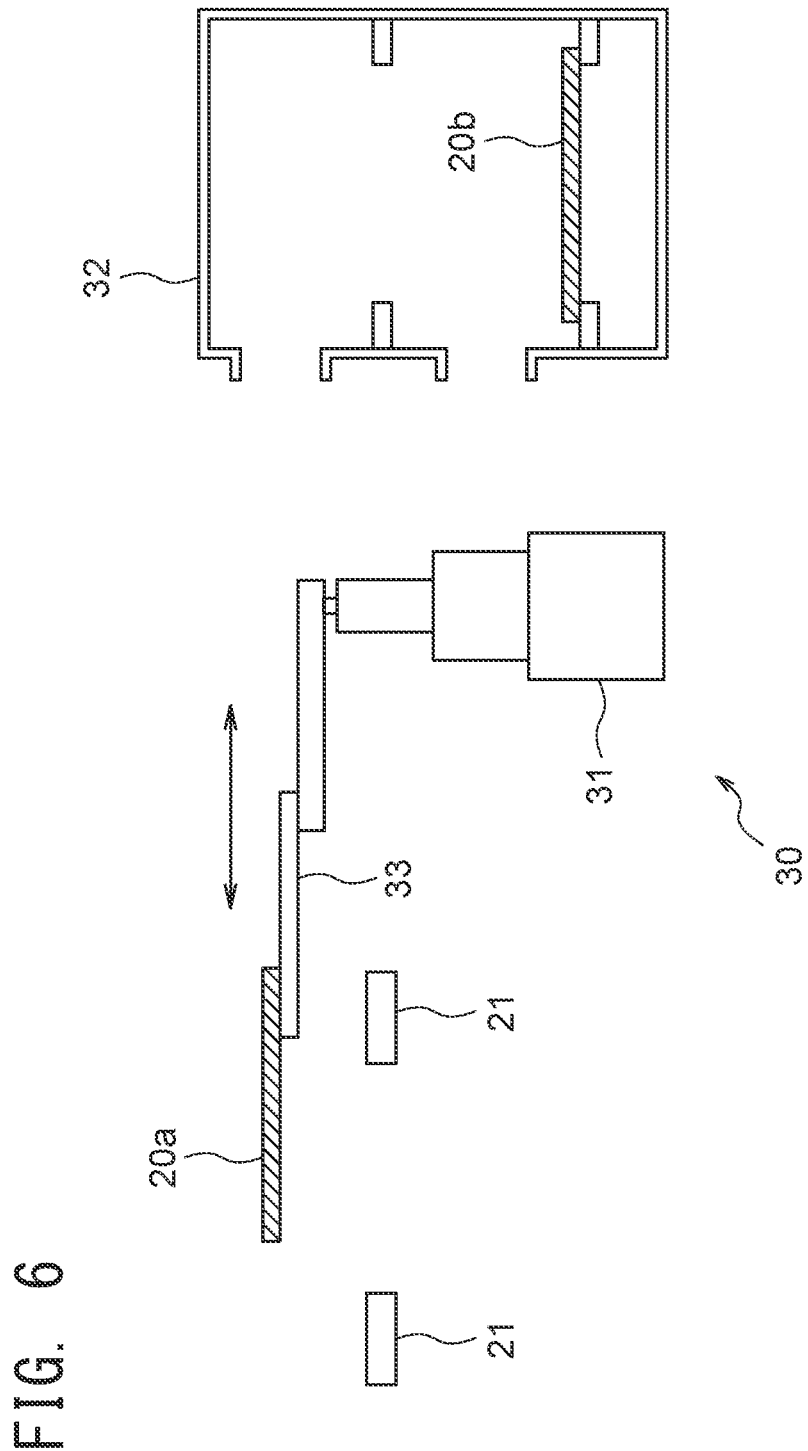

POLARIZED LIGHT IRRADIATION APPARATUS AND METHOD FOR POLARIZED LIGHT IRRADIATION

TECHNICAL FIELD

The present invention relates to an apparatus for irradiating a work with polarized light and to a method of irradiating a work with polarized light.

BACKGROUND ART

Conventionally, for alignment processing applied to alignment films used in liquid crystal display elements such as liquid crystal panels, a technique referred to as photo-alignment has been adopted as disclosed in Japanese Patent No. 4968165. In photo-alignment, films are irradiated with polarized light of a predetermined wavelength.

In recent years, utilization of polarized light has been considered in fields other than liquid crystal display elements. For example, there are materials that exhibit different optical properties depending on a direction of polarization when irradiated with polarized light. Attempts have been made to develop optical elements that utilize such properties (see Seokil Moon et al., "Augmented reality near-eye display using Pancharatnam-Berry phase lenses," Scientific Reports 9, Article number: 6616, 2019).

Seokil Moon et al. disclose that a virtual world image is projected with light with right-handed circular (RHC) polarization to a region of an optical element, and a real world image is projected with light with left-handed circular (LHC) polarization to another region of the optical element. The virtual world image and the real world image are combined for display.

To manufacture the optical element disclosed by Seokil Moon et al., it is necessary to divide a certain material into two regions and to irradiate the respective regions with light having different polarizations. It is envisaged that the boundary line between the two regions may not necessarily be straight, and may have a complex shape.

There has not been developed a polarized light irradiation apparatus capable of irradiating respective multiple regions of a single material (work) with light having different polarizations.

An object of the present invention is to provide an apparatus for irradiating respective multiple regions of a single work with light having different polarizations, and a method therefor.

According to one aspect of the present invention, there is provided a polarized light irradiation apparatus that includes a light source unit including a light source and emitting parallel light derived from the light source; a polarizing plate for polarizing the parallel light emitted from the light source unit to output polarized light; a polarizing plate holder for holding the polarizing plate; a mask holder for holding a mask having a light transmissive part and a light shielding part; a work stage for holding a work that is irradiated with light that has been polarized by the polarizing plate and has passed the mask; a polarization direction changer for changing a direction of a polarization axis of the polarized light that irradiates the work held by the work stage; and an irradiation location changer for changing a location of the polarized light that irradiates the work.

Since the direction of the polarization axis of the polarized light that irradiates the work and the location of the work irradiated with the polarized light can be changed, it is possible to respectively irradiate multiple regions of a single work with light having different polarizations.

The polarization direction changer may include a polarizing plate rotator for rotating the polarizing plate held by the polarizing plate holder in a plane perpendicular to the parallel light that enters the polarizing plate. By this configuration, a single polarizing plate can be used for producing polarized light having different polarizations. Furthermore, this configuration improves a degree of freedom for change of design since the direction of the polarization axis is changed by rotation of the polarizing plate. In addition, since polarized light irradiation apparatuses are usually provided with rotation mechanisms for adjusting the angle of a polarizing plate relative to a work, the direction of the polarization axis may be changed by use of an existing rotation mechanism.

The polarizing plate holder may be configured to simultaneously hold multiple polarizing plates having different polarization directions. The polarization direction changer may include a polarizing plate slider for moving the polarizing plate holder in a plane perpendicular to the parallel light that enters the polarizing plate, so as to replace a polarizing plate aligned with an optical path of the parallel light with another polarizing plate. By this configuration, the currently used polarizing plate can be readily replaced with another one having a different polarization direction.

The polarization direction changer may include a polarizing plate changer for replacing a polarizing plate held by the polarizing plate holder with another polarizing plate having a different polarization direction. By this configuration, the currently used polarizing plate can be readily replaced with another one having a different polarization direction.

The polarization direction changer may change the direction of the polarization axis of polarized light for irradiating the work by 90 degrees. By this configuration, two regions of a single work can be respectively irradiated with polarized light having polarization axes that differ by 90 degrees.

The irradiation location changer may include a mask changer for replacing a mask held by the mask holder with another mask having a different arrangement of the light transmissive part and the light shielding part. By this configuration, the currently used mask can be readily replaced with another one having a different arrangement of the light transmissive part and the light shielding part. In addition, since polarized light irradiation apparatuses are usually provided with replacement mechanisms for replacing masks, an existing replacement mechanism may be used to change the location of polarized light for irradiating the work.

The mask holder may be configured to hold multiple masks simultaneously, with each of the masks having a different arrangement of the light transmissive part and the light shielding part. The irradiation location changer may include a mask slider for moving the mask holder in a plane perpendicular to the parallel light that enters the mask, so as to replace a mask aligned with an optical path of the parallel light with another mask. By this configuration, the currently used mask can be readily replaced with another one having a different arrangement of the light transmissive part and the light shielding part.

The irradiation location changer may include a mask rotator for rotating the mask held by the mask holder in a plane perpendicular to the parallel light that enters the mask, so as to interchange locations of the light transmissive part and the light shielding part. By this configuration, a single mask can be used for selectively shielding a region of the work. The work may be bisected such that the boundary line between the two regions is a straight line. The mask M is rotated by 180 degrees, so that each of the two regions is irradiated with light of a different polarization.

According to another aspect of the present invention, there is provided a method of irradiating a work with polarized light of parallel rays through a mask having a light transmissive part and a light shielding part. The method includes irradiating a first region of the work with polarized light having a polarization axis extending in a first direction; changing a direction of a polarization axis of polarized light for irradiating the work from the first direction to a second direction that is different from the first direction after irradiating the first region; changing a location of the polarized light that irradiates the work for changing a location of the work irradiated with polarized light from the first region to a second region that is different from the first region; and irradiating the second region of the work with polarized light having a polarization axis extending in the second direction.

Changing the direction of the polarization axis may include rotating a polarizing plate that outputs the polarized light in a plane perpendicular to parallel light that enters the polarizing plate.

Changing the direction of the polarization axis may include moving a polarizing plate holder that simultaneously holds multiple polarizing plates having different polarization directions, so as to replace a polarizing plate that outputs the polarized light with another polarizing plate.

Changing the direction of the polarization axis may include replacing a polarizing plate held by a polarizing plate holder with another polarizing plate having a different polarization direction.

Changing the direction of the polarization axis may include changing the direction of the polarization axis of polarized light for irradiating the work by 90 degrees.

Changing the location of the polarized light may include replacing a mask held by a mask holder with another mask having a different arrangement of the light transmissive part and the light shielding part.

Changing the location of the polarized light may include moving a mask holder that simultaneously holds multiple masks having different arrangements of the light transmissive part and the light shielding part, so as to replace a mask aligned with an optical path of the polarized light with another mask.

Changing the location of the polarized light may include rotating a mask in a plane perpendicular to the polarized light that enters the mask, so as to interchange locations of the light transmissive part and the light shielding part.

BRIEF DESCRIPTION OF THE DRAWINGS

FIG. 6 is a schematic view showing an example of a polarizing plate changer mechanism.

DESCRIPTION OF EMBODIMENTS

Hereinafter, with reference to the accompanying drawings, embodiments of the present invention will be described.

Figure 1:
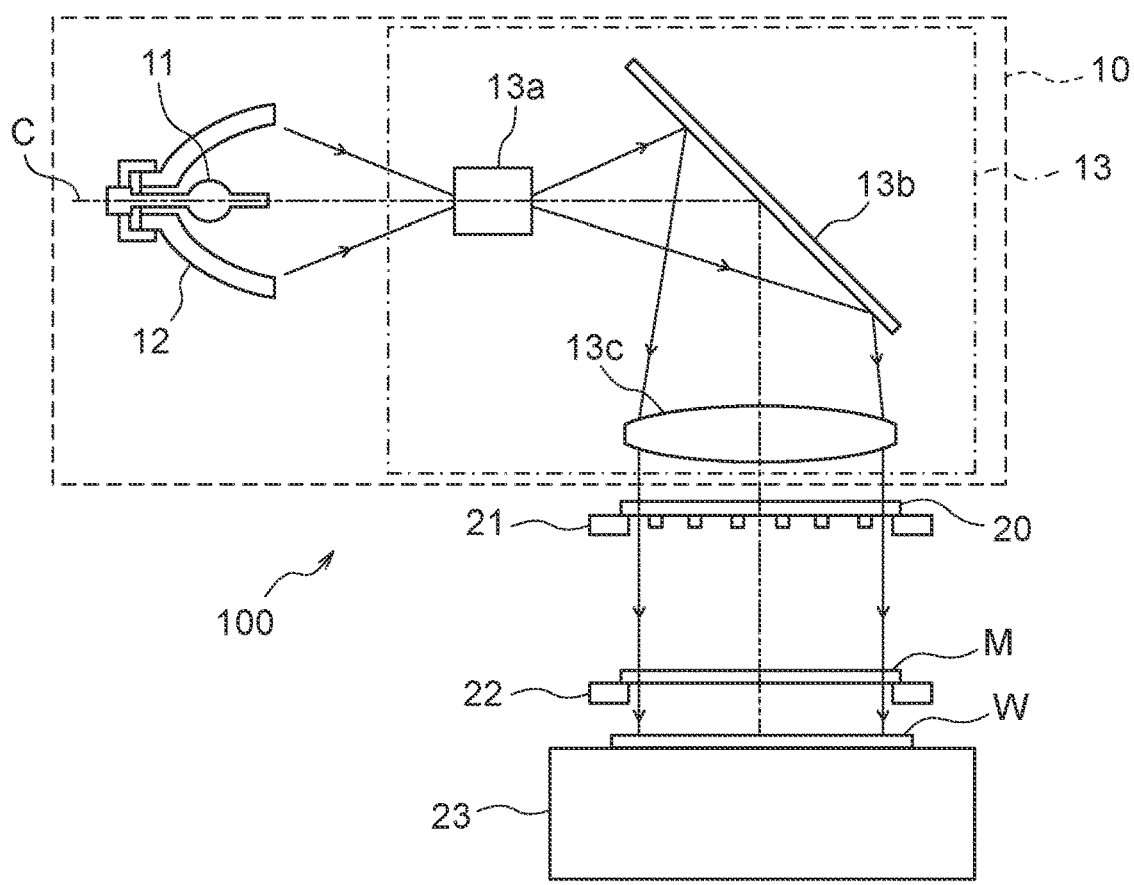
FIG. 1 is a schematic view showing a basic structure of a polarized light irradiation apparatus according to an embodiment of the present invention.

FIG. 1 is a schematic view showing a basic structure of a polarized light irradiation apparatus 100 according to an embodiment of the present invention.

The polarized light irradiation apparatus 100 includes a light source unit 10. The light source unit 10 includes a light source 11, a reflector 12, and an optical irradiation system 13. The optical irradiation system 13 includes an integrator lens 13a, a plane mirror 13b, and a collimator lens 13c.

The light source 11 is, for example, a short-arc type discharge lamp that has a configuration in which a pair of electrodes (not shown) are arranged in the arc tube along the tube axis.

The reflector 12 is an elliptical condensing mirror surrounding the light source 11, and reflects and condenses light emitted from the light source 11.

The integrator lens 13a is also referred to as a fly eye lens. The integrator lens 13a is of a configuration in which multiple lenses are arranged side by side and is used to make uniform illuminance distribution on an exposure surface. The integrator lens 13a is disposed in the vicinity of the focal point of the reflector 12 and disposed on the optical axis C of the light.

The plane mirror 13b reflects light that has passed the integrator lens 13a toward the collimator lens 13c. However, use of the plane mirror 13b is not necessary in a case in which light that has passed the integrator lens 13a is directly introduced into the collimator lens 13c.

The collimator lens 13c is a lens that converts an incoming divergent light beam from its focal point into a parallel light beam. As the collimator lens 13c, a convex lens may be used. In this embodiment, the reflector 12, which is an elliptical condensing mirror, and the collimator lens 13c, which is a convex lens, constitute a parallel light forming unit that converts the light beam from the light source 11 into a parallel light beam.

Figure 2:
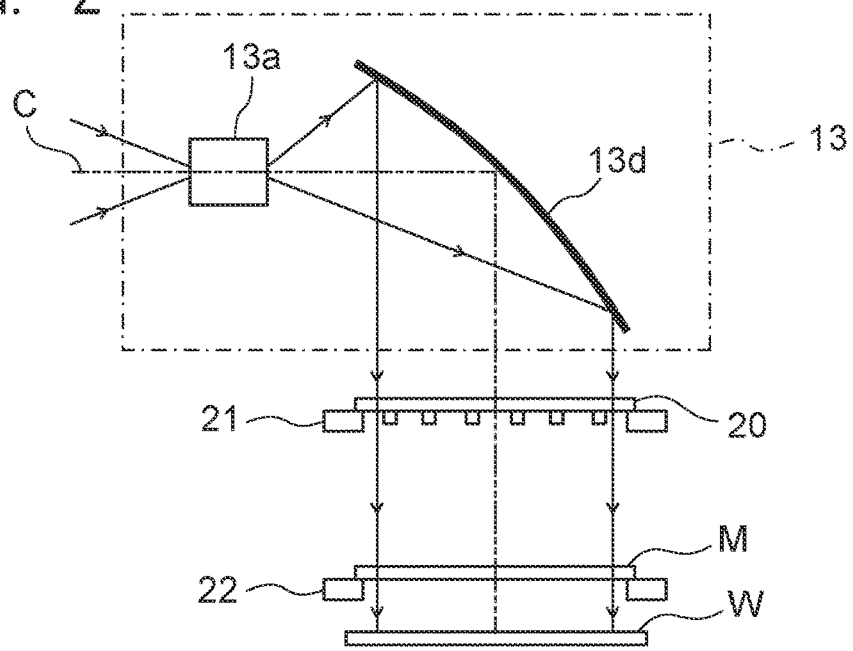
FIG. 2 is a schematic view showing an example of an optical irradiation system of a polarized light irradiation apparatus.

A collimator mirror can be used instead of the collimator lens 13c. In this case, as shown in FIG. 2, the optical irradiation system 13 includes an integrator lens 13a and a collimator mirror 13d. The collimator mirror 13d has a parabolic reflecting surface that converts an incoming divergent light beam from its focal point into a parallel light beam. In the configuration shown in FIG. 2, the reflector 12, which is an elliptical condensing mirror, and the collimator mirror 13d, which is a parabolic mirror, together constitute a parallel light forming unit.

The structure of the optical irradiation system 13 is not limited to the above examples, and may be modified in so far as the light source unit 10 can emit a bundle of parallel rays. Furthermore, the light source unit 10 can be a multi-lamp type unit that includes a plurality of light sources 11. In addition, the light source 11 is not limited to a horizontal lighting type shown in FIG. 1 and can emit rays vertically. Additionally, the polarized light irradiation apparatus 100 may be a projection type in which a projection lens is interposed between a mask M and a work W.

The parallel light emitted from the light source unit 10 enters a polarizing plate 20. The polarizing plate 20 is an optical filter through which light waves of a specific polarization can pass while light waves of other polarizations are blocked. In this embodiment, the polarizing plate 20 is composed of a grid polarizing element that converts unpolarized light into light with a single linear polarization. The grid polarizing element has a transparent substrate made of, for example, glass or quartz, and many fine parallel bars formed at regular intervals on a surface of the substrate. The bars are made of at least one of a dielectric material and a metallic material. The polarizing plate 20 is held by a polarizing plate holder 21.

The polarized light that has passed the polarizing plate 20 passes through a mask M and then irradiates a work W. The mask M includes a transparent substrate and a pattern formed on the substrate. The pattern includes a light transmissive part and a light shielding part so that the polarized light irradiates only a predetermined region of the work W. The mask M is held by a mask stage (mask holder) 22.

A work stage 23 holds the work W that is the object to be processed. The work W may be, for example, a substrate for an oriented film in a liquid crystal display device. The work stage 23 is provided with a fixing mechanism for fixing the work W on the top surface of the work stage 23. The fixing mechanism may include, for example, vacuum suction grooves (not shown).

Next, basic usage of the polarized light irradiation apparatus 100 will be described.

Light emitted from the light source 11 is reflected and collected by the reflector 12, which is an elliptical condensing mirror. The light collected by the reflector 12 enters the integrator lens 13a. The light that has passed the integrator lens 13a diverges and is reflected by the plane mirror 13b toward the collimator lens 13c. The parallel light rays that have passed the collimator lens 13c pass through the polarizing plate 20. The polarized light that has passed the polarizing plate 20 reaches the mask M. The polarized light that has passed the mask M irradiates a part of the work W held by the work stage 23. The irradiated part varies depending on the pattern of the mask M.

As mentioned above, the mask M is used for irradiating with the polarized light only a predetermined region of the work W. Therefore, the mask M and the work W are aligned before irradiating the polarized light. Although the alignment of mask M and work W is not described in detail, any conventional scheme used for exposure devices that transfer patterns of electric circuits to works can be applied.

As described above, in this embodiment, the light source unit 10 is configured to emit parallel light rays. As a result, while the parallel light rays pass through the mask M, the parallel light rays do not intrude into the part shaded by the mask M.

In addition, in a case in which the light rays entering the polarizing plate 20 are parallel rays, the outgoing polarized rays have good characteristics, e.g., an improved extinction ratio and a uniform polarization. Accordingly, it is preferable to arrange not only the mask M but also the polarizing plate 20 on the light exit side of the collimator lens 13c.

Furthermore, if the mask M is placed as close as possible to the work W, the contrast between the light-irradiated region and the light-shielded region on the work W can be clearly differentiated. Accordingly, it is preferable to arrange the mask M on the light exit side of the polarizing plate 20 and to place the mask M as close as possible to the work W.

Next, the structure of the mask M and the irradiation procedure of polarized light will be described.

Figure 3:
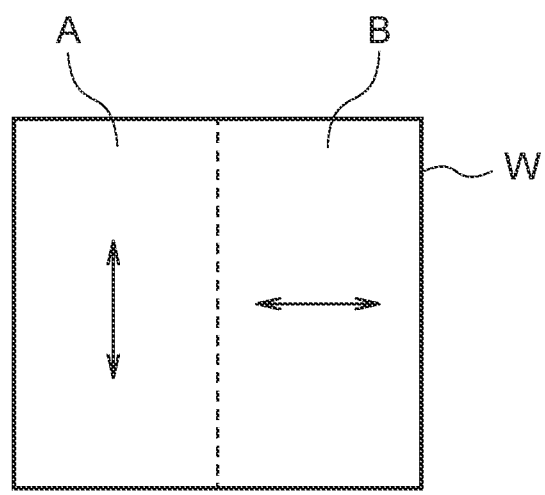
FIG. 3 is a plan view showing an example of a work.

In this embodiment, as shown in FIG. 3, the work W is divided into region A and region B. It is assumed that region A is irradiated with polarized light having a polarization axis extending in the vertical direction of FIG. 3, whereas region B is irradiated with polarized light having a polarization axis extending in the transverse direction of FIG. 3.

To respectively irradiate the regions A and B with polarized light having different polarization axis directions (polarization directions), it is necessary to carry out two irradiation steps for each single work W, in which the region to be irradiated and the polarization axis of polarized light are changed.

More specifically, the polarized light irradiation apparatus 100 first irradiates a first region (region A) of the work W with polarized light having a polarization axis extending in a first direction (vertical direction in FIG. 3). Then, the polarized light irradiation apparatus 100 changes the direction of the polarization axis of polarized light to a second direction (transverse direction in FIG. 3), and changes the target region to be irradiated with polarized light from the first region to a second region (region B). Consequently, the polarized light irradiation apparatus 100 irradiates the second region of the work W with polarized light having a polarization axis extending in the second direction.

Accordingly, the polarized light irradiation apparatus 100 includes a polarization direction changer that changes the direction of the polarization axis of polarized light for irradiating the work W, and an irradiation location changer that changes the location of the polarized light that irradiates the work for changing the location of the work W irradiated with polarized light.

In an embodiment, the irradiation location changer may switch between the light transmissive part and the light shielding part of the mask M. To achieve this object, two methods (1) and (2) are considered. Method (1) includes preparing two masks M, each of which has a light transmissive part and a light shielding part, and replacing a used mask M with the other mask M so that the positions of the light transmissive part and the light shielding part are interchanged. Method (2) includes rotating a single mask M so that the positions of the light transmissive part and the light shielding part are interchanged.

In an embodiment, the polarization direction changer may change the orientation of the grid of the polarizing plate 20 by 90 degrees. To achieve this object, two methods (3) and (4) are considered. Method (3) includes preparing two polarizing plates 20 having polarization axis directions that differ by 90 degrees, and replacing a used polarizing plate 20 with the other polarizing plate 20 so that the orientation of the grid is changed by 90 degrees. Method (4) includes rotating a single polarizing plate 20 by 90 degrees.

Figure 4A:
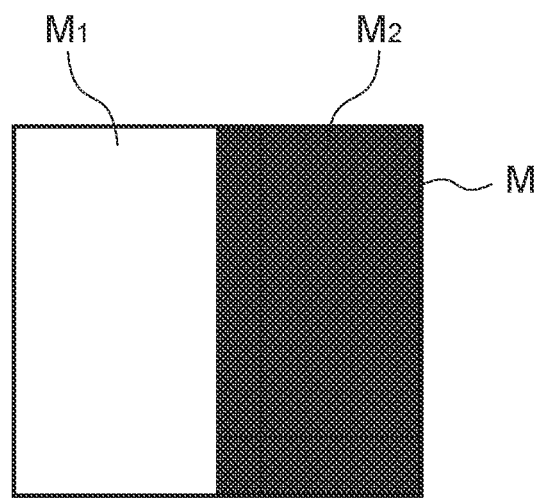
FIG. 4A is a plan view showing an example of a mask.
Figure 4B:
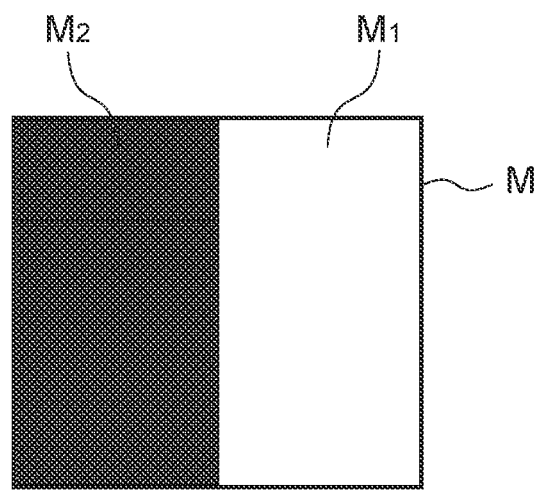
FIG. 4B is a plan view showing another example of a mask.

More specifically, if method (1) is used, two masks M shown in FIGS. 4A and 4B are prepared. In the mask M shown in FIG. 4A, the light transmissive part $M_1$ is formed in the location corresponding to region A in FIG. 3, whereas the light shielding part $M_2$ is formed in the location corresponding to region B in FIG. 3. On the other hand, in the mask M shown in FIG. 4B, the light shielding part $M_2$ is formed in the location corresponding to region A in FIG. 3, whereas the light transmissive part $M_1$ is formed in the location corresponding to region B in FIG. 3. When region A of the work W is irradiated, the mask M shown in FIG. 4A is used, and when region B is irradiated, the mask M shown in FIG. 4B is used. In either case, the masks M are placed in a plane perpendicular to the optical axis C shown in FIG. 1 or 2.

However, if method (2) is used, only the mask M shown in FIG. 4A is used. The mask M is placed in a plane perpendicular to the optical axis C shown in FIG. 1 or 2. After irradiating region A of the work W, the mask M is rotated by 180 degrees about the center of the mask M in the plane perpendicular to the optical axis C, so that the mask M is oriented in the state shown in FIG. 4B, so as to shield region A of the work W while irradiating region B.

However, method (2) may be adopted only if the work W can be bisected such that the boundary line between regions A and B is a straight line as in this embodiment.

Figure 5A:
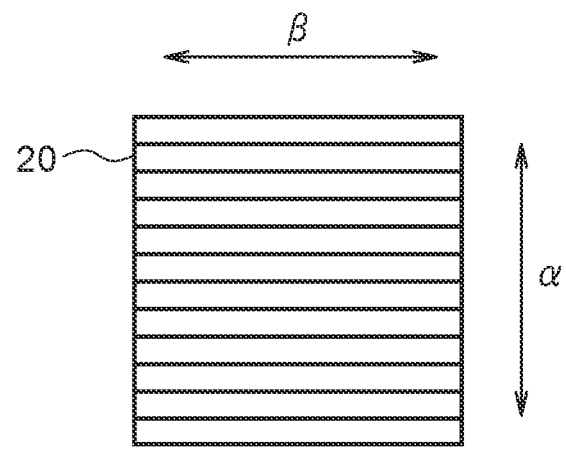
FIG. 5A is a plan view showing an example of a polarizing plate.
Figure 5B:
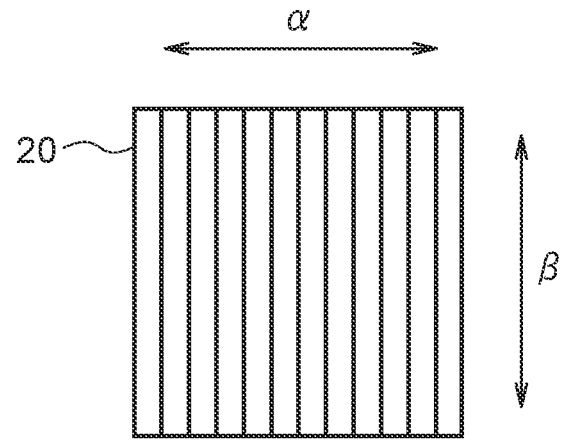
FIG. 5B is a plan view showing another example of a polarizing plate.

The grid polarizing element allows polarized light having a polarization axis in the direction perpendicular to the direction of the grid to pass. Accordingly, if method (3) is used, two polarizing plates 20 shown in FIGS. 5A and 5B are prepared. In the polarizing plate 20 shown in FIG. 5A, the grid extends along the transverse direction, so that polarized light with a polarization axis in the vertical direction is transmitted through the polarizing plate 20. In the drawings, the direction indicated by arrow a is the direction of the polarization axis of the transmitted polarized light, and the direction indicated by arrow 13 is the direction of the grid. In the polarizing plate 20 shown in FIG. 5B, the grid extends along the vertical direction, so that polarized light with a polarization axis in the transverse direction is transmitted through the polarizing plate 20. When region A of the work W is irradiated, the polarizing plate 20 shown in FIG. 5A is used, and when region B of the work W is irradiated, the polarizing plate 20 shown in FIG. 5B is used. In either case, the polarizing plates 20 are placed in a plane perpendicular to the optical axis C shown in FIG. 1 or 2.

However, if method (4) is used, only the polarizing plate 20 shown in FIG. 5A is utilized. The polarizing plate 20 is placed in a plane perpendicular to the optical axis C shown in FIG. 1 or 2. After irradiation of region A of the work W, the polarizing plate 20 is rotated by 90 degrees about the center of the polarizing plate 20 in the plane perpendicular to the optical axis C, so that the polarizing plate 20 is oriented in the state shown in FIG. 5B. As a result, the regions A and B are respectively irradiated with different polarized light having polarization axis directions that differ by 90 degrees.

Next, replacement method (1) for the mask M, rotation method (2) for the mask M, replacement method (3) for the polarizing plate 20, and rotation method (4) for the polarizing plate 20 will be described in detail.

The mask M is a flat plate in which a light shielding part is formed on a transparent substrate, and the polarizing plate 20 is also a flat plate in which a fine grid is formed on a transparent substrate. The mask M and the polarizing plate 20 are similar in that they are each flat plates with transparent substrates. Therefore, the replacement mechanism and the rotation mechanism for the mask M may be very similar to those for the polarizing plate 20. The replacement mechanism and the rotation mechanism for the polarizing plate 20 will be described in more detail than the replacement mechanism and the rotation mechanism for the mask M, but a person skilled in the art will understand the replacement mechanism and the rotation mechanism for the mask M.

Replacement Mechanism for the Polarizing Plate 20

The replacement method (3) for the polarizing plate 20 may be classified into two different methods (A) and (B). In method (A), the polarizing plate holder 21 holds only one polarizing plate 20 at a time. In method (A), when the target region of the work W to be irradiated with polarized light is changed, the polarizing plate 20 held by the polarizing plate holder 21 is replaced with another polarizing plate 20. In method (B), the polarizing plate holder 21 simultaneously holds multiple (e.g., two) polarizing plates 20. In method (B), when the target region of the work W to be irradiated with polarized light is changed, the polarizing plate holder 21 is driven to slide in a plane perpendicular to the optical axis C to change the polarizing plate 20 aligned with the optical path of the parallel light.

Hereinafter, replacement method (A) will be referred to as a "changer method," while replacement method (B) will be referred to as a "slide method."

FIG. 6 is a schematic view showing an example of the polarizing plate changer mechanism 30 for achieving the replacement of the polarizing plates 20 according to the changer method (method (A)).

The polarizing plate changer mechanism 30 includes a polarizing plate changing robot 31 and a polarizing plate stocker 32. The polarizing plate stocker 32 is a shelf that can store two polarizing plates 20a and 20b having different polarization axis directions. The polarizing plate changer mechanism 30 can change the polarizing plate held by the polarizing plate holder 21 from the polarizing plate 20a to the polarizing plate 20b and vice versa.

More specifically, the polarizing plate changing robot 31 includes a polarizing plate carrying arm 33. The polarizing plate carrying arm 33 is capable of expansion and contraction and is capable of rotation. The polarizing plate changing robot 31 withdraws one of the polarizing plates 20a and 20b from the polarizing plate stocker 32 by use of the polarizing plate carrying arm 33, and places the polarizing plate on the polarizing plate holder 21. In addition, the polarizing plate changing robot 31 picks up the polarizing plate from the polarizing plate holder 21 by use of the polarizing plate carrying arm 33, and returns it to the polarizing plate stocker 32.

For irradiating region A (see FIG. 3) of the work W with polarized light, as shown in FIG. 6, the polarizing plate changing robot 31 takes out the polarizing plate 20a (the polarizing plate 20 shown in FIG. 5A) that is suitable for irradiating region A, and places it on the polarizing plate holder 21. Then, the polarized light irradiation apparatus 100 irradiates region A with the polarized light. By this time, the mask M shown in FIG. 4A has been deployed by the replacement mechanism or the rotation mechanism for the mask M.

After completion of irradiating region A with polarized light, the polarized light irradiation apparatus 100 temporarily stops the light irradiation, and the polarizing plate changing robot 31 returns the polarizing plate 20a placed on the polarizing plate holder 21 to the polarizing plate stocker 32. Next, the polarizing plate changing robot 31 takes out the polarizing plate 20b (the polarizing plate 20 shown in FIG. 5B) that is suitable for irradiating region B from the polarizing plate stocker 32, and places it on the polarizing plate holder 21. Then, the polarized light irradiation apparatus 100 restarts the light irradiation for irradiating region B with polarized light. By this time, the mask M shown in FIG. 4B has been deployed by the replacement mechanism or the rotation mechanism for the mask M. In this way, each of two regions A and B on a single work W is irradiated with light having a different polarization axis.

In this specification, the polarizing plate changer mechanism 30 is also referred to as a polarizing plate changer.

Figure 7:
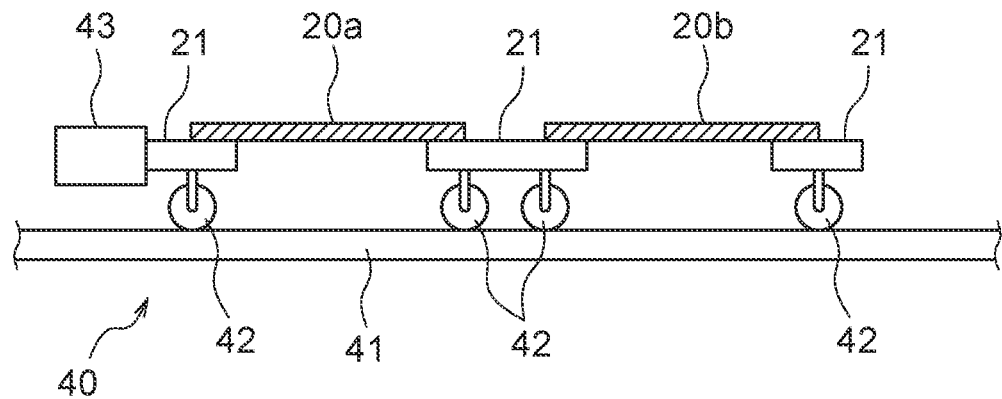
FIG. 7 is a schematic view showing an example of a polarizing plate sliding mechanism.

FIG. 7 is a schematic view showing an example of a polarizing plate sliding mechanism 40 for achieving the replacement of the polarizing plates 20 according to the slide method (method (B)).

The polarizing plate sliding mechanism 40 is configured to be capable of holding two types of polarizing plates 20a and 20b, one for irradiating region A and the other for irradiating region B. The polarizing plate sliding mechanism 40 includes a rail 41, which extends in a direction along which the polarizing plate holder 21 is slid, and multiple wheels (rollers) 42 attached to the polarizing plate holder 21. The polarizing plate holder 21 is held on the rail 41 by the wheels 42. The polarizing plate sliding mechanism 40 also includes at least one motor 43 engaged with at least one of the wheels 42. The motor 43 rotates in both directions to drive the wheel and to cause the polarizing plate holder 21 to reciprocate on the rail 41 in the lateral directions of FIG. 7.

More specifically, for irradiating region A (see FIG. 3) of the work W with polarized light, the polarizing plate sliding mechanism 40 slides the polarizing plate holder 21 and stops it at the position at which the polarizing plate 20a (the polarizing plate 20 shown in FIG. 5A) that is suitable for irradiating region A is aligned with the optical path of the parallel light. Then, the polarized light irradiation apparatus 100 irradiates region A with the polarized light. By this time, the mask M shown in FIG. 4A has been deployed by the replacement mechanism or the rotation mechanism for the mask M.

After completion of irradiating region A with polarized light, the polarized light irradiation apparatus 100 temporarily stops the light irradiation, and the polarizing plate sliding mechanism 40 moves the polarizing plate holder 21 to the left in FIG. 7 and stops it at the position at which the polarizing plate 20b (the polarizing plate 20 shown in FIG. 5B) that is suitable for irradiating region B is aligned with the optical path of the parallel light. Then, the polarized light irradiation apparatus 100 restarts the light irradiation for irradiating region B with polarized light. By this time, the mask M shown in FIG. 4B has been deployed by the replacement mechanism or the rotation mechanism for the mask M. In this way, each of two regions A and B on a single work W is irradiated with light having a different polarization axis.

FIG. 7 shows an embodiment in which the polarizing plate holder 21 is moved linearly along one direction, but the polarizing plate holder 21 may be rotated by a revolving mechanism. In addition, FIG. 7 shows an embodiment in which the polarizing plate holder 21 is moved via the wheels 42 along the rail 41, but the polarizing plate holder 21 may be moved by means of a cylinder.

In this specification, the polarizing plate sliding mechanism 40 is also referred to as a polarizing plate slider.

Rotation Mechanism for the Polarizing Plate 20

Figure 8:
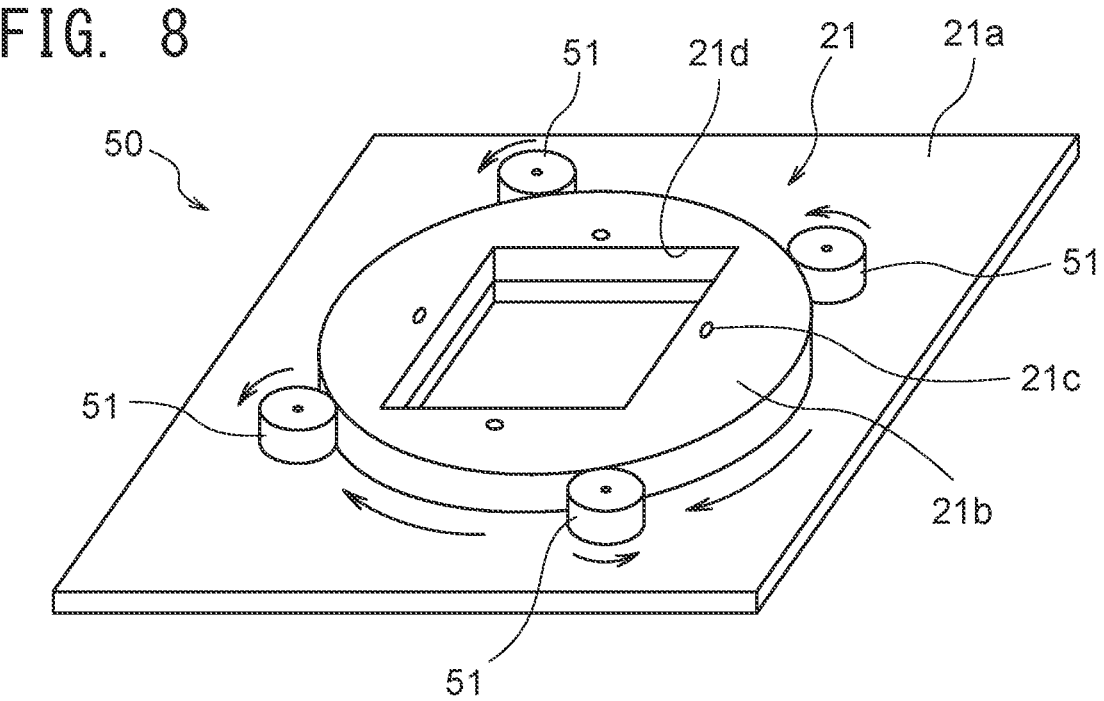
FIG. 8 is a perspective view showing an example of a polarizing plate rotation mechanism.

FIG. 8 is a perspective view showing an example of a polarizing plate rotation mechanism 50 for rotating the polarizing plate 20, i.e., for achieving rotation method (4).

As shown in FIG. 8, the polarizing plate holder 21 includes a base plate 21a and a circular rotational stage 21b rotatably provided on the base plate 21a. The rotational stage 21b is mounted to the base plate 21a so as to be capable of rotating in a plane parallel to the base plate 21a. In addition, vacuum suction holes 21c (or vacuum suction grooves) for holding the polarizing plate are formed in the rotational stage 21b. The base plate 21a and the rotational stage 21b are provided with an aperture 21d through which light passes. In FIG. 8, the aperture 21d is rectangular, but the shape of the aperture 21d is not limited to a rectangular shape and can be defined appropriately depending on a shape of the work W and/or the light irradiation region on the work W.

The polarizing plate rotation mechanism 50 includes a plurality of rollers 51 (four rollers 51 in the example of FIG. 8) for rotating the rotational stage 21b. The rollers 51 are rotatably attached to the base plate 21a. The rotational stage 21b is supported on the base plate 21a, and the peripheral surfaces of the rollers 51 are pressed to the peripheral surface of the rotational stage 21b. The polarizing plate rotation mechanism 50 also includes at least one motor (not shown) engaged with at least one of the rollers 51. Rotation of the motor causes the rollers 51 to rotate, which results in rotation of the rotational stage 21b. FIG. 8 shows an embodiment in which the polarizing plate rotation mechanism 50 includes four rollers 51, but the number of the rollers 51 can be determined at need.

For irradiating region A (see FIG. 3) of the work W with polarized light, the polarizing plate rotation mechanism 50 orients the rotation angle of the rotational stage 21b of the polarizing plate holder 21, so that the polarizing plate 20 held on the rotational stage 21b is oriented to be suitable for irradiating region A (the orientation of the polarizing plate 20 shown in FIG. 5A). Then, the polarized light irradiation apparatus 100 irradiates region A with the polarized light. By this time, the mask M shown in FIG. 4A has been deployed by the replacement mechanism or the rotation mechanism for the mask M.

After completion of irradiating region A with polarized light, the polarized light irradiation apparatus 100 temporarily stops the light irradiation. Then, the rotational stage 21b is rotated by 90 degrees, and therefore, the polarizing plate 20 held on the rotational stage 21b is oriented so as to be suitable for irradiating region B (the orientation of the polarizing plate 20 shown in FIG. 5B). If a similar mechanism is utilized for the mask rotation mechanism for rotating the mask M, the rotational stage of the mask stage 22 is rotated by 180 degrees.

After rotation of the rotational stage 21b, the polarized light irradiation apparatus 100 restarts the light irradiation for irradiating region B with polarized light. By this time, the mask M shown in FIG. 4B has been deployed by the replacement mechanism or the rotation mechanism for the mask M. In this way, each of two regions A and B on a single work W is irradiated with light having a different polarization axis.

In this specification, the polarizing plate rotation mechanism 50 is also referred to as a polarizing plate rotator.

Replacement Mechanism for the Mask M

Figure 9:
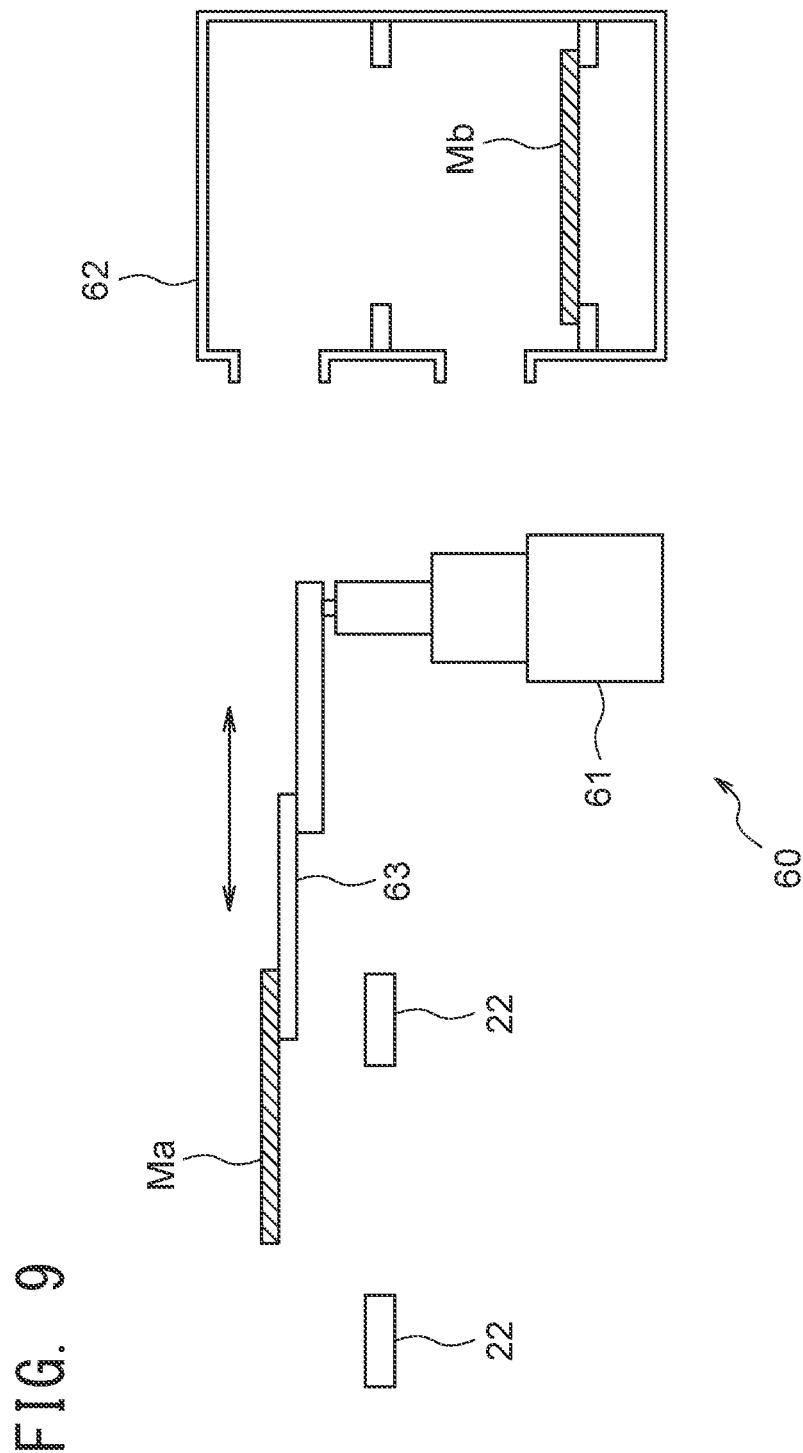
FIG. 9 is a schematic view showing an example of a mask changer mechanism.

FIG. 9 is a schematic view showing an example of the mask changer mechanism 60 for achieving the replacement of the mask M according to a changer method (one kind of replacement method (1) for the mask).

The mask changer mechanism 60 includes a mask changing robot 61 and a mask stocker 62. The mask stocker 62 is a shelf that can store two masks Ma and Mb having different arrangements of the light transmissive part and the light shielding part. One of the masks Ma and Mb is used for irradiating region A and the other is used for irradiating region B. The mask changer mechanism 60 can change the mask M held by the mask stage 22 from the mask Ma to the mask Mb and vice versa.

More specifically, the mask changing robot 61 includes a mask carrying arm 63. The mask carrying arm 63 is capable of expansion and contraction and is capable of rotation. The mask changing robot 61 takes out one of the masks Ma and Mb from the mask stocker 62 by use of the mask carrying arm 63, and places the mask on the mask stage 22. In addition, the mask changing robot 61 picks up the mask from the mask stage 22 by use of the mask carrying arm 63, and returns it to the mask stocker 62.

Accordingly, a suitable mask is selectively aligned with the optical path of the polarized light for selectively shielding one of the regions of the work W. In other words, a suitable mask M aligned with the optical path of the polarized light is replaced with another one for selectively shielding a region of the work W.

In this specification, the mask changer mechanism 60 is also referred to as a mask changer.

Figure 10:
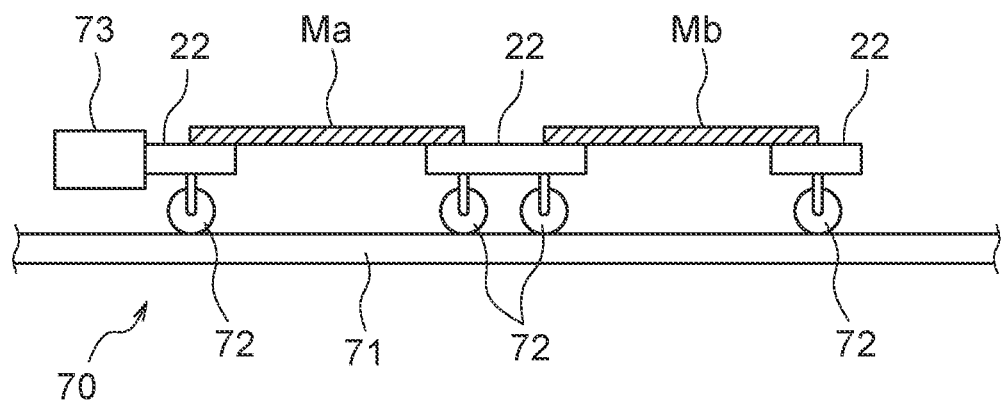
FIG. 10 is a schematic view showing an example of a mask sliding mechanism.

FIG. 10 is a schematic view showing an example of a mask sliding mechanism 70 for achieving the replacement of the masks M according to a slide method (one kind of replacement method (1) for the mask).

The mask sliding mechanism 70 is configured to be capable of holding two types of masks Ma and Mb having different arrangements of the light transmissive part and the light shielding part. One of the masks Ma and Mb is used for irradiating region A and the other is used for irradiating region B. The mask sliding mechanism 70 includes a rail 71, which extends in a direction along which the mask stage 22 is slid, and multiple wheels (rollers) 72 attached to the mask stage 22. The mask stage 22 is held on the rail 71 by the wheels 72. The mask sliding mechanism 70 also includes at least one motor 73 engaged with at least one of the wheels 72. The motor 73 rotates in both directions to drive the wheel and to cause the mask stage 22 to reciprocate on the rail 71 in the lateral directions in FIG. 10.

Accordingly, the mask stage 22 is driven to slide in a plane perpendicular to the optical axis C to change the mask M aligned with the optical path of the polarized light for selectively shielding one of regions of the work W. In other words, a suitable mask M aligned with the optical path of the polarized light is replaced with another one for selectively shielding a region of the work W.

FIG. 10 shows an embodiment in which the mask stage 22 is moved linearly along one direction, but the mask stage 22 may be rotated by a revolving mechanism. In addition, FIG. 10 shows an embodiment in which the mask stage 22 is moved via the wheels 72 along the rail 71, but the mask stage 22 may be moved by means of a cylinder.

In this specification, the mask sliding mechanism 70 is also referred to as a mask slider.

Rotation Mechanism for the Mask M

Figure 11:
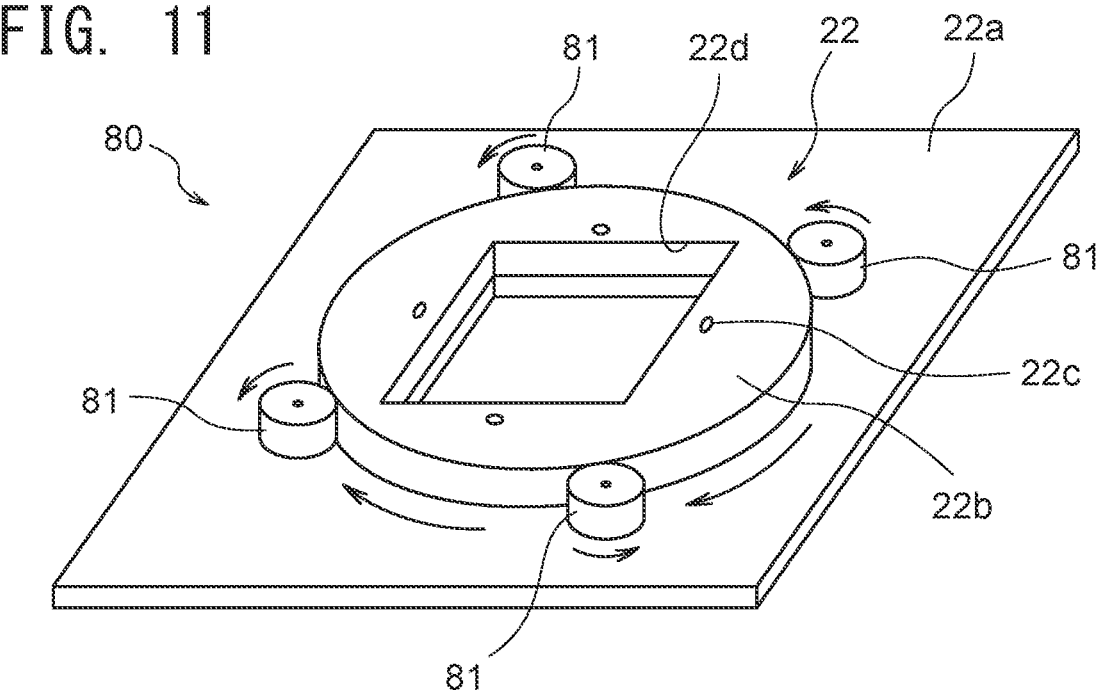
FIG. 11 is a perspective view showing an example of a mask rotation mechanism.

FIG. 11 is a perspective view showing an example of a mask rotation mechanism 80 for rotating the mask M, i.e., for achieving rotation method (2).

As shown in FIG. 11, the mask stage 22 includes a base plate 22a and a circular rotational stage 22b rotatably provided on the base plate 22a. The rotational stage 22b is mounted to the base plate 22a, so as to be capable of rotating in a plane parallel to the base plate 22a. In addition, vacuum suction holes 22c (or vacuum suction grooves) for holding the mask are formed in the rotational stage 22b. The base plate 22a and the rotational stage 22b are provided with an aperture 22d through which light passes. In FIG. 11, the aperture 22d is rectangular, but the shape of the aperture 22d is not limited to being rectangular in shape and can be defined appropriately depending on the shape of the mask M, the shape of the work W, and/or the light irradiation region on the work W.

The mask rotation mechanism 80 includes a plurality of rollers 81 (four rollers 81 in the example of FIG. 11) for rotating the rotational stage 22b. The rollers 81 are rotatably attached to the base plate 22a. The rotational stage 22b is supported on the base plate 22a, and the peripheral surfaces of the rollers 81 are pressed to the peripheral surface of the rotational stage 22b. The mask rotation mechanism 80 also includes at least one motor (not shown) engaged with at least one of the rollers 81. Rotation of the motor causes the rollers 81 to rotate, which results in rotation of the rotational stage 22b. FIG. 11 shows an embodiment in which the mask rotation mechanism 80 includes four rollers 81, but the number of the rollers 81 can be determined at need.

The mask rotation mechanism 80 orients the rotation angle of the rotational stage 22b of the mask stage 22, so that the mask M held on the rotational stage 22b is selectively oriented, so as to interchange locations of the light transmissive part and the light shielding part. A single mask M is used for selectively shielding one of the regions of the work W.

In this specification, the mask rotation mechanism 80 is also referred to as a mask rotator.

As described above, the polarized light irradiation apparatus 100 in this embodiment includes a polarization direction changer that changes the direction of the polarization axis (polarization direction) of the polarized light the work W is to be irradiated with, and an irradiation location changer that changes the location of the polarized light that irradiates the work for changing the location of polarized light for irradiating the work W. Accordingly, it is possible to irradiate each of different regions on a single work W with light having a different polarization axis.

The polarization direction changer may be the polarizing plate changer mechanism 30 shown in FIG. 6, may be the polarizing plate sliding mechanism 40 shown in FIG. 7, or may be the polarizing plate rotation mechanism 50 shown in FIG. 8. The irradiation location changer may be the mask changer mechanism 60 shown in FIG. 9, may be the mask sliding mechanism 70 shown in FIG. 10, or may be the mask rotation mechanism 80 shown in FIG. 8.

In a case in which the polarizing plate changer mechanism 30 is used for the polarization direction changer, the polarizing plate changing robot 31 having the polarizing plate carrying arm 33 as shown in FIG. 6 can readily replace a polarizing plate 20 with another polarizing plate 20 that allows passage of polarized light having a different polarization axis direction.

In a case in which the polarizing plate sliding mechanism 40 is used for the polarization direction changer, the polarizing plate holder 21 holding a plurality of types of polarizing plates 20 is simply slid, so that it is possible to easily switch the polarizing plate 20 aligned with the optical path of the parallel light from the light source unit 10 to another polarizing plate 20 that allows passage of polarized light having a different polarization axis direction.

In a case in which the polarizing plate rotation mechanism 50 is used for the polarization direction changer, only a single type of the polarizing plate 20 needs to be prepared. In this case, if the polarizing plate rotation mechanism 50 is configured so as to be capable of rotating the polarizing plate 20 up to 180 degrees (90 degrees in both directions), the direction of the polarization axis can be reliably changed to a desired direction. In addition, since polarized light irradiation apparatuses are usually provided with rotation mechanisms for adjusting an angle of a polarizing plate relative to a work, the direction of the polarization axis can be changed by use of an existing rotation mechanism.

In addition, polarized light irradiation apparatuses are usually provided with replacement mechanisms for replacing masks. In a case in which the mask changer mechanism

60 is used for the irradiation location changer, an existing replacement mechanism is used to change the location of polarized light for irradiating the work W.

As described above, the polarized light irradiation apparatus 100 in this embodiment can irradiate each of different regions on a single work W with light having a different polarization axis. As a result, for example, it is possible to provide an optical element that outputs outgoing light of which a property varies depending on which of clockwise circular polarized light or counterclockwise circular polarized light enters the optical element.

Modifications

Although the present invention has been described, the foregoing description is not intended to limit the present invention. Various modifications including one or more omissions, additions, and substitutions of structural elements may be made within the scope of the present invention.

It has been described that methods of changing the direction of the polarization axis of polarized light irradiating a single work W include a method of replacing a polarizing plate 20 (method (3)) and a method of rotating a polarizing plate 20 (method (4)). As an alternative method, the work W may be rotated relative to the polarizing plate 20. In this case, the work stage 23 is configured to be rotatable.

It has been described that the polarization axis direction of the polarized light for irradiating region A of the work W differs from that for region B of the work W by 90 degrees. However, the difference between directions of polarization axes of polarized lights for irradiating regions is not limited to 90 degrees.

It has also been described that a single work is divided into two regions A and B irradiated with two kinds of polarized light. However, a work may be divided into three or more regions and the regions may be irradiated with three or more kinds of polarized light.

This application is based on Japanese Patent Application No. 2019-232588 filed on Dec. 24, 2019, and the entire disclosure thereof is incorporated herein by reference.

What is claimed is:

1. A polarized light irradiation apparatus comprising:
    a light source unit comprising a light source and emitting parallel light derived from the light source;
    a polarizing plate for polarizing the parallel light emitted from the light source unit to output polarized light;
    a polarizing plate holder for holding the polarizing plate;
    a mask holder for holding a mask having a light transmissive part and a light shielding part;
    a work stage for holding a work that is irradiated with light that has been polarized by the polarizing plate and has passed the mask;
    a polarization direction changer for changing a direction of a polarization axis of the polarized light that irradiates the work held by the work stage; and
    an irradiation location changer for changing a location of the polarized light that irradiates the work.

2. The polarized light irradiation apparatus according to claim 1, wherein the polarization direction changer comprises a polarizing plate rotator for rotating the polarizing plate held by the polarizing plate holder in a plane perpendicular to the parallel light that enters the polarizing plate.

3. The polarized light irradiation apparatus according to claim 1, wherein the polarizing plate holder is configured to simultaneously hold multiple polarizing plates having different polarization directions, and
    wherein the polarization direction changer comprises a polarizing plate slider for moving the polarizing plate holder in a plane perpendicular to the parallel light that enters the polarizing plate, so as to replace a polarizing plate aligned with an optical path of the parallel light with another polarizing plate.

4. The polarized light irradiation apparatus according to claim 1, wherein the polarization direction changer comprises a polarizing plate changer for replacing a polarizing plate held by the polarizing plate holder with another polarizing plate having a different polarization direction.

5. The polarized light irradiation apparatus according to claim 1, wherein the polarization direction changer changes the direction of the polarization axis of polarized light for irradiating the work by 90 degrees.

6. The polarized light irradiation apparatus according to claim 1, wherein the irradiation location changer comprises a mask changer for replacing a mask held by the mask holder with another mask having a different arrangement of the light transmissive part and the light shielding part.

7. The polarized light irradiation apparatus according to claim 1, wherein the mask holder is configured to simultaneously hold multiple masks, the masks having different arrangements of the light transmissive part and the light shielding part, and
    wherein the irradiation location changer comprises a mask slider for moving the mask holder in a plane perpendicular to the parallel light that enters the mask, so as to replace a mask aligned with an optical path of the parallel light with another mask.

8. The polarized light irradiation apparatus according to claim 1, wherein the irradiation location changer comprises a mask rotator for rotating the mask held by the mask holder in a plane perpendicular to the parallel light that enters the mask, so as to interchange locations of the light transmissive part and the light shielding part.

* * * * *